United States Patent
Shanmugam et al.

(10) Patent No.: US 11,011,182 B2
(45) Date of Patent: May 18, 2021

(54) AUDIO PROCESSING SYSTEM FOR SPEECH ENHANCEMENT

(71) Applicant: NXP B.V., Eindhoven (NL)

(72) Inventors: Gunasekaran Shanmugam, Bangalore (IN); Omkar Reddy, Bangalore (IN); Vinoda Kumar Somashekhara, Bangalore (IN)

(73) Assignee: NXP B.V., Eindhoven (NL)

( * ) Notice: Subject to any disclaimer, the term of this patent is extended or adjusted under 35 U.S.C. 154(b) by 197 days.

(21) Appl. No.: 16/364,130

(22) Filed: Mar. 25, 2019

(65) Prior Publication Data

US 2020/0312342 A1 Oct. 1, 2020

(51) Int. Cl.

| | |
|---|---|
| *G10L 21/0216* | (2013.01) |
| *G06F 1/3212* | (2019.01) |
| *G06F 1/3234* | (2019.01) |
| *G10L 15/20* | (2006.01) |
| *G10L 19/06* | (2013.01) |

(Continued)

(52) U.S. Cl.
CPC .......... *G10L 21/0216* (2013.01); *G06F 1/325* (2013.01); *G06F 1/3212* (2013.01);
(Continued)

(58) Field of Classification Search
CPC . G10L 21/0216; G10L 21/0208; G10L 15/20; G10L 19/06; G10L 21/028;
(Continued)

(56) References Cited

U.S. PATENT DOCUMENTS

| | | | |
|---|---|---|---|
| 7,590,530 B2* | 9/2009 | Zhao | H04R 25/55 704/200 |
| 8,401,178 B2* | 3/2013 | Chen | H04R 3/005 379/406.03 |

(Continued)

FOREIGN PATENT DOCUMENTS

CN 101464168 A 6/2009

OTHER PUBLICATIONS

Laverty, Stephen William, "Detection of Nonstationary Noise and Improved Voice Activity Detection in an Automotive Hands-free Environment", Thesis submitted to the faculty of the Worcester Polytechnic Institute, USA, May 2005.

(Continued)

*Primary Examiner* — Edwin S Leland, III
(74) *Attorney, Agent, or Firm* — Lloyd E. Dakin, Jr.

(57) ABSTRACT

An audio processing system has multiple microphones that capture an audio signal. A noise suppression circuit analyses the audio signal to detect a type of noise present in the signal (e.g., stationary or non-stationary background noise). Based on the detected background noise type, the system operates in either a first or second mode of operation. In the first mode (stationary noise detected), one microphone is used to enhance a speech signal from the audio signal, and in the second mode (non-stationary noise detected), more than one microphone is used to enhance the speech signal. Processing more than one microphone input signal requires additional complexity and more processing power than one-microphone speech enhancement, so by classifying the background noise type and then switching between one microphone or N-microphones based speech enhancement, processing power is reduced during stationary noise conditions.

18 Claims, 5 Drawing Sheets

(51) Int. Cl.
    *G10L 21/028*     (2013.01)
    *G06F 1/3215*     (2019.01)
    *G06F 1/3287*     (2019.01)
    *G10L 21/0208*     (2013.01)
    *G10L 25/78*     (2013.01)

(52) U.S. Cl.
    CPC .......... *G06F 1/3215* (2013.01); *G06F 1/3287* (2013.01); *G10L 15/20* (2013.01); *G10L 19/06* (2013.01); *G10L 21/0208* (2013.01); *G10L 21/028* (2013.01); *G10L 25/78* (2013.01); *G10L 2021/02165* (2013.01); *G10L 2021/02166* (2013.01)

(58) Field of Classification Search
    CPC .......... G10L 25/78; G10L 2021/02165; G10L 2021/02166; G06F 1/3215; G06F 1/3287; G06F 1/325; G06F 1/3212
    USPC ....................................................... 704/233
    See application file for complete search history.

(56) References Cited

U.S. PATENT DOCUMENTS

| | | | | |
|---|---|---|---|---|
| 8,422,697 | B2* | 4/2013 | Christoph | G10L 21/0208 381/94.1 |
| 8,463,607 | B2* | 6/2013 | Tanaka | G10K 11/178 704/233 |
| 8,798,289 | B1* | 8/2014 | Every | G10L 25/48 381/94.1 |
| 8,972,255 | B2* | 3/2015 | Leman | G10L 25/00 704/233 |
| 9,264,804 | B2* | 2/2016 | Åhgren | H04R 3/00 |
| 9,668,048 | B2* | 5/2017 | Sakri | H04R 3/005 |
| 9,773,493 | B1* | 9/2017 | Lu | G10K 11/17881 |
| 9,966,085 | B2* | 5/2018 | Song | G10L 21/0208 |
| 2003/0120485 | A1* | 6/2003 | Murase | G10L 25/78 704/228 |
| 2008/0082323 | A1* | 4/2008 | Bai | G06K 9/0051 704/214 |
| 2013/0343584 | A1* | 12/2013 | Bennett | H04R 25/554 381/315 |
| 2020/0312342 | A1* | 10/2020 | Shanmugam | G06F 1/325 |

OTHER PUBLICATIONS

Prabhavathi C.N., "Noise Classification and Estimation", Ch. 3, Speech Enhancement Under Non Stationary and Stationary Acoustic Field Noise Conditions, Jain University, India, Feb. 15, 2017, pp. 17-25.

* cited by examiner

AUDIO PROCESSING SYSTEM FOR SPEECH ENHANCEMENT

BACKGROUND

The present invention relates generally to electronic circuits, and, more particularly, to an audio processing system for speech enhancement.

In communication systems, speech signals captured by microphones are either transmitted over digital channels for communication or stored in a digital format. Such speech signals include a speech component and a noise component that affects the quality of the speech signals. The noise component may include stationary noise and non-stationary noise. Communication systems usually make use of audio processing systems to enhance the quality of the speech signals such as to suppress the noise present in the speech signals and improve the signal to noise ratio (SNR) of the speech signals.

One-mic noise suppression is a technique used in an audio processing system to improve the SNR of a primary speech signal received from a primary microphone (mic) of the system. The one-mic noise suppression technique includes modelling the noise present in the primary speech signal and suppressing the noise using a spectral subtraction method. The spectral subtraction method is effective when the type of noise present in the primary speech signal is stationary noise. However, if the type of noise present in the primary speech signal is non-stationary noise, the spectral subtraction method is ineffective.

Another known technique for suppressing the noise in the primary speech signal is an n-mic noise suppression technique. The n-mic noise suppression technique includes modelling the noise present in the primary speech signal using secondary speech signals provided by secondary microphones and then suppressing the noise in the primary speech signal using the modelling. This technique effectively suppresses both stationary and non-stationary noise. However, processing multiple speech signals simultaneously increases the complexity of the audio processing system, which requires greater processing power than processing one speech signal. However, the quality of an output primary speech signal is the same for both the one-mic and n-mic noise suppression techniques when only the stationary noise is present in the primary speech signal.

Accordingly, it would be advantageous to have an audio processing system that uses less processing power to suppress noise present in a speech signal while maintaining the quality of the speech signal.

BRIEF DESCRIPTION OF THE DRAWINGS

The following detailed description of the preferred embodiments of the present invention will be better understood when read in conjunction with the appended drawings. The present invention is illustrated by way of example, and not limited by the accompanying figures, in which like references indicate similar elements.

DETAILED DESCRIPTION

Figure 1:
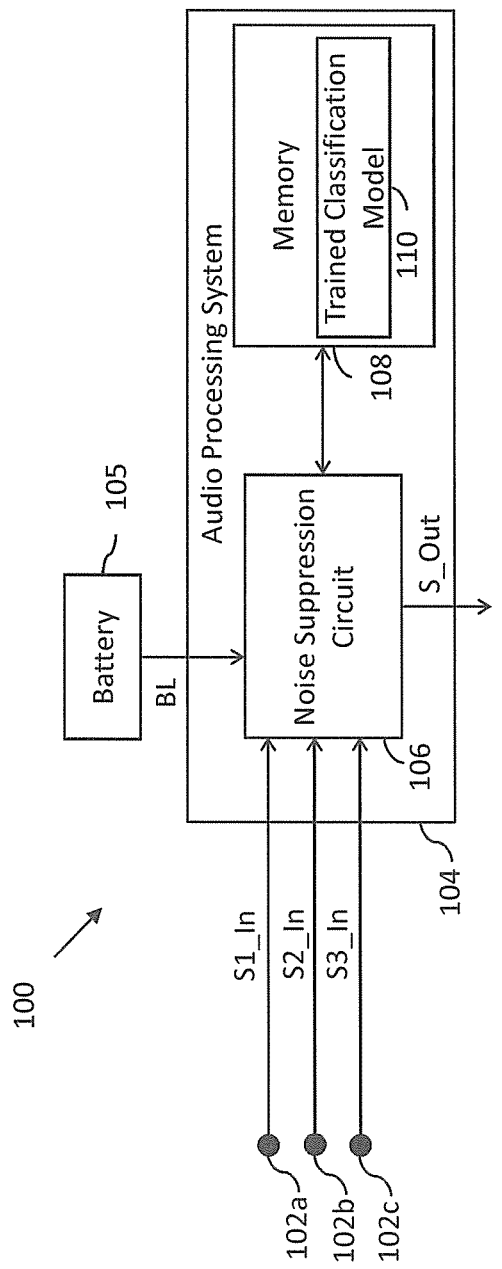
FIG. 1 is a schematic block diagram of an electronic device including first through third microphones and an audio processing system in accordance with an embodiment of the present invention.

The detailed description of the appended drawings is intended as a description of the currently preferred embodiments of the present invention, and is not intended to represent the only form in which the present invention may be practiced. It is to be understood that the same or equivalent functions may be accomplished by different embodiments that are intended to be encompassed within the spirit and scope of the present invention.

In one embodiment, the present invention provides an audio processing system including a noise suppression circuit that operates in one of a first mode of operation and a second mode of operation. The noise suppression circuit receives a primary speech signal from a primary microphone of a plurality of microphones coupled to the system, and extracts a set of features from a non-speech region of the primary speech signal. The noise suppression circuit detects a type of noise in the non-speech region using the extracted set of features and selects one of the first and second modes of operation based on the detected type of noise, to suppress noise in the primary speech signal.

In another embodiment, the present invention provides a method for speech enhancement. The method includes receiving, by a noise suppression circuit, a primary speech signal from a primary microphone of a plurality of microphones. The method further includes extracting, by the noise suppression circuit, a set of features from a non-speech region of the primary speech signal. The method further includes detecting, by the noise suppression circuit, a type of noise in the non-speech region based on the extracted set of features. The method further includes selecting, by the noise suppression circuit, based on the detected type of noise, one of a first mode of operation and a second mode of operation for suppressing noise in the primary speech signal.

In yet another embodiment, the present invention provides a noise suppression circuit including an analyzer, a noise classification circuit, and a mode selection circuit. The analyzer receives a primary speech signal and extracts a set of features from a non-speech region of the primary speech signal. The noise classification circuit receives the extracted set of features from the analyzer and detects a type of noise in the non-speech region using the extracted set of features. The mode selection circuit selects one of first and second modes of operation of the noise suppression circuit based on the detected noise type to suppress noise in the primary speech signal. In the first operation mode, only the primary speech signal is processed and in the second operation mode, a plurality of speech signals, including the primary speech signal, received from a plurality of microphones is processed. In one embodiment, if a power level of a battery used to power the noise suppression circuit is low, then the first operation mode is selected by the mode selection circuit.

Various embodiments of the present invention provide an audio processing system and a method for speech enhancement. The audio processing system includes a noise suppression circuit that receives a primary speech signal from a primary microphone and secondary speech signals from secondary microphones. The noise suppression circuit operates in one of a first mode of operation and a second mode of operation based on a type of noise detected in the primary speech signal. The noise suppression circuit operates in the first mode of operation when the type of noise is stationary noise and operates in the second mode of operation when the type of noise is different from the stationary noise, i.e., non-stationary noise. The noise suppression circuit further operates in the first mode when a power level of a battery associated with the audio processing system is less than a predetermined threshold level. In other words, the noise suppression circuit switches between the first and second modes of operation based on the type of noise detected in the primary speech signal and the battery power level. In the first mode of operation, the noise suppression circuit suppresses noise in the primary speech signal to generate an enhanced speech signal and discards the secondary speech signals. In the second mode of operation, the noise suppression circuit suppresses the noise in the primary speech signal using the primary and secondary speech signals.

The noise suppression circuit discards the secondary speech signals when only stationary noise is detected in the primary speech signal. The noise suppression circuit is capable of dynamically switching to the second mode of operation when non-stationary noise is detected in the primary speech signal. Further, the noise suppression circuit is capable of switching from the second mode to the first mode when the battery power level falls below a predetermined threshold level. Thus, the noise suppression circuit requires less processing power for enhancing the primary speech signal while maintaining the quality of the enhanced speech signal.

Referring now to FIG. 1, a block diagram of an electronic device 100 including first through third microphones (mics) 102a-102c and an audio processing system 104, in accordance with an embodiment of the present invention is shown. The electronic device 100 is powered by a battery 105, although in other embodiments, the device 100 may not include a battery and instead be powered by an external power device. Examples of the electronic device 100 include various mobile communications devices, like a mobile phone, a tablet, a laptop or desktop computer, an intercom station, a digital cordless phone, etc.

The first through third mics 102a-102c, when active, capture sound and generate first through third speech signals S1_In-S3_In, respectively. Based on the orientation of the electronic device 100, one of the first through third mics 102a-102c operates as a primary mic and the remaining mics operate as secondary mics. A speech signal generated by the primary mic is referred to as a primary speech signal PSS. It will be apparent to those of skill in the art that the scope of the electronic device 100 is not limited to three mics, but may include any number of mics without deviating from the scope of the invention.

The audio processing system 104 is connected to the first through third mics 102a-102c for receiving the first through third speech signals S1_In-S3_In, respectively. The audio processing system 104 is further connected to the battery 105 for receiving a battery power level signal BL from the battery 105, which indicates the power level of the battery 105. The audio processing system 104 suppresses noise present in the primary speech signal PSS of the first through third speech signals S1_In-S3_In and generates an enhanced speech signal S_Out.

The audio processing system 104 includes a noise suppression circuit 106 and a memory 108. The noise suppression circuit 106 receives the battery level signal BL from the battery 105. The noise suppression circuit 106 further receives the first through third speech signals S1_In-S3_In from the first through third mics 102a-102c, respectively, and identifies one of the first through third mics 102a-102c as the primary mic and the corresponding speech signal as the primary speech signal. For example, the noise suppression circuit 106 may identify the first mic 102a as the primary mic and the first speech signal S1_In as the primary speech signal PSS. The noise suppression circuit 106 further identifies the second and third mics 102b and 102c as the secondary mics and the second and third speech signals S2_In and S3_In as first and second secondary speech signals SSS_1 and SSS_2. It will be apparent to those of skill in the art that at any given point in time, any of the first through third mics 102a-102c may operate as the primary mic.

The noise suppression circuit 106 detects a non-speech region of the primary speech signal PSS and extracts a set of features from the non-speech region. The set of features includes a spectral flux and a spectral centroid. Based on the set of features, the noise suppression circuit 106 detects a type of noise present in the non-speech region. The type of noise is classified as one of a stationary noise and a non-stationary noise. Based on the detected noise type and the battery level indicated by the battery level signal BL, the noise suppression circuit 106 operates in one of first and second modes of operation to suppress the noise present in the primary speech signal PSS and to generate the enhanced speech signal S_Out.

The noise suppression circuit 106 operates in the first mode when the type of noise present in the primary speech signal PSS is stationary noise. The noise suppression circuit 106 also operates in the first mode when the power level of the battery indicated by the battery level signal BL is less than a predetermined threshold value. That is, in the presently preferred embodiment, the noise suppression circuit 106 operates in the first mode of the battery power level is below the predetermined threshold regardless of which type of noise is detected in the primary speech signal.

The noise suppression circuit 106 operates in the second mode of operation when the type of noise present in the primary speech signal PSS is different from the stationary noise and the battery level indicated by the battery level signal BL is greater than the predetermined threshold level. In the first mode, the noise suppression circuit 106 processes the primary speech signal PSS and discards the secondary speech signals SSS_1 and SSS_2, while in the second mode, the noise suppression circuit 106 processes the primary speech signal PSS and at least one of the first and second secondary speech signals SSS_1 and SSS_2 to generate the enhanced speech signal S_Out.

The memory 108 is connected to the noise suppression circuit 106. Examples of the memory 108 include a static random-access memory (SRAM), a dynamic random-access memory (DRAM), or any other type of secondary storage device. The memory 108 stores a trained classification model 110. The trained classification model 110 is trained using samples of pre-collected stationary and non-stationary noise. The noise suppression circuit 106 uses the trained classification model 110 to detect the type of noise present in the primary speech signal PSS.

Figure 2:
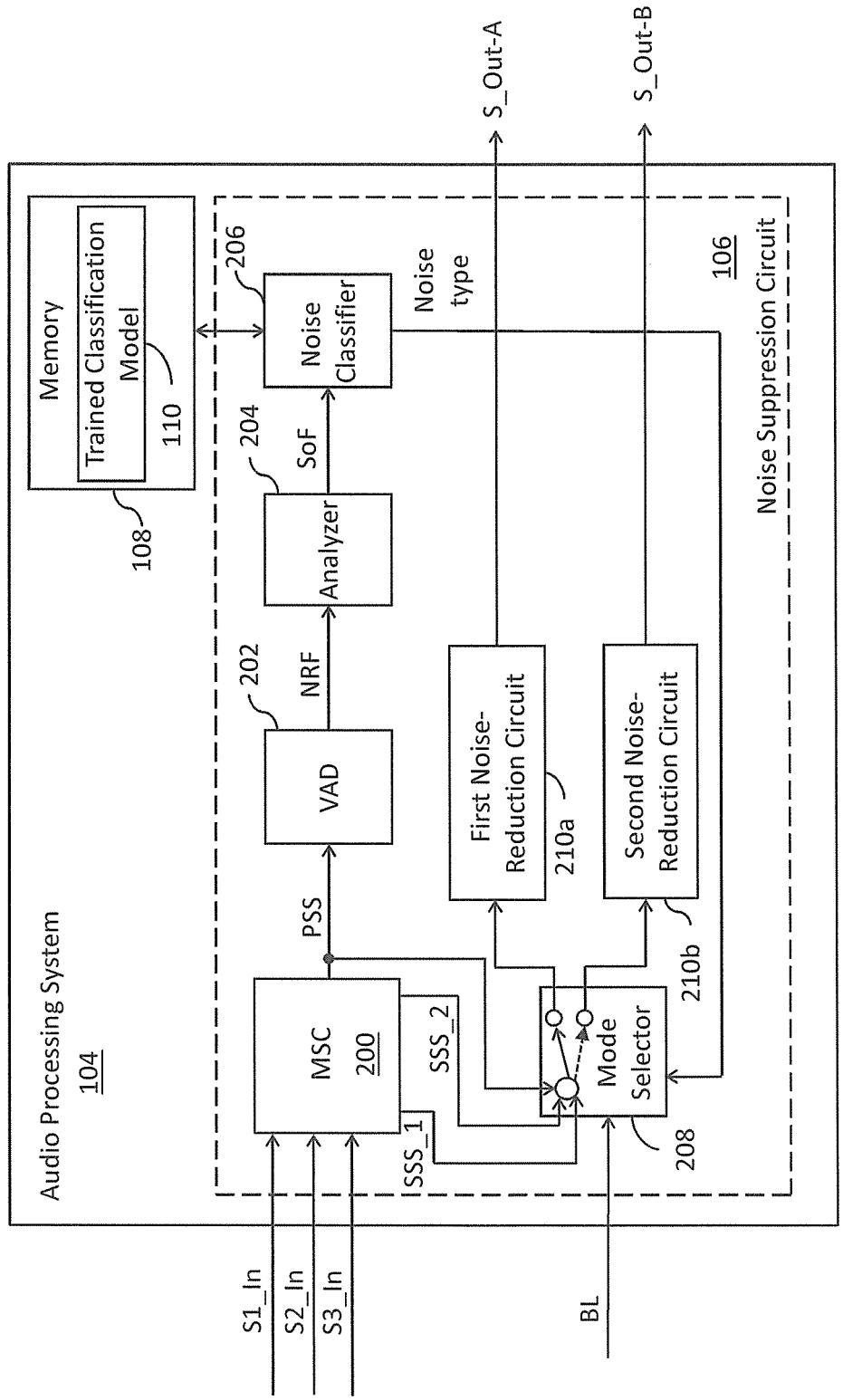
FIG. 2 is a schematic block diagram of the audio processing system of FIG. 1 in accordance with an embodiment of the present invention.

Referring now to FIG. 2, a block diagram of the audio processing system 104 and the noise suppression circuit 106 in accordance with an embodiment of the present invention is shown. The noise suppression circuit 106 includes a mic selection circuit (MSC) 200, a voice activity detector (VAD) 202, an analyzer 204, a noise classification circuit 206, a mode selection circuit 208, a first noise-reduction circuit 210a, and a second noise-reduction circuit 210b.

The MSC 200 is connected to the first through third mics 102a-102c for receiving the first through third speech signals S1_In-S3_In, respectively. The MSC 200 samples the first through third speech signals S1_In-S3_In and segments the sampled first through third speech signals S1_In-S3_In into overlapping frames of a defined duration (for example, 10 milli-seconds, ms). In one example, a percentage of overlap between two consecutive frames is equal to 50%. Each frame includes a fixed set of samples of the corresponding speech signal. For example, each frame of the first speech signal S1_In includes 80 consecutive samples of the first speech signal S1_In.

The MSC 200 identifies one of the first through third mics 102a-102c as the primary mic based on various factors, such as intensities of the first through third speech signals S1_In-S3_In, the orientation of the electronic device 100, or the like. In one embodiment, the MSC 200 identifies the first mic 102a as the primary mic. Thus, the second and third mics 102b and 102c are identified as the secondary mics. When the first mic 102a is identified as the primary mic, the first speech signal S1_In acts as the primary speech signal PSS and the second and third speech signals S2_In and S3_In act as the first and second secondary speech signals SSS_1 and SSS_2, respectively. Hereinafter, the first speech signal S1_In is referred to as the primary speech signal PSS and the second and third speech signals S2_In and S3_In are referred to as the first and second secondary speech signals SSS_1 and SSS_2, respectively. The MSC 200 outputs the frames of the primary speech signal PSS to the VAD 202 and the frames of the first and second secondary speech signals SSS_1 and SSS_2 to the mode selector 208.

The VAD 202 receives the frames of the primary speech signal PSS. For each frame of the primary speech signal PSS, the VAD 202 detects voice activity, i.e., detects the presence of speech in each frame of the primary speech signal PSS. The VAD 202 discards the frames of the primary speech signal PSS in which the voice activity is detected. The frames of the primary speech signal PSS in which no voice activity is detected are identified as non-speech regions of the primary speech signal PSS. The VAD 202 outputs the frames of the primary speech signal PSS that are identified as the non-speech regions. Hereinafter, each frame of the primary speech signal PSS that is identified as the non-speech region is referred to as a "non-speech region frame NRF".

The analyzer 204 is connected to the VAD 202 and receives the non-speech region frames NRFs. The analyzer 204 converts each non-speech region frame NRF from the time domain to the frequency domain by applying a windowing technique followed by a Fast Fourier Transform (FFT). Examples of the windowing technique applied by the analyzer 204 include a Hanning window, a Rectangular window, a Hamming window, or the like. Hereinafter, the non-speech region frames NRFs that are converted to the frequency domain are referred to as "transformed frames". The analyzer 204 then extracts a set of features SoF from the transformed frames and outputs the extracted set of features SoF. The set of features SoF is a feature vector that includes the spectral flux and the spectral centroid.

Spectral flux is a measure of how rapidly a power spectrum of the primary speech signal PSS fluctuates. A value of the spectral flux is determined by comparing the power spectrum of a present transformed frame against the power spectrum of a previous transformed frame. In one embodiment, the analyzer 204 determines the spectral flux for the present transformed frame of the primary speech signal PSS using equation 1 below:

$$\text{Spectral Flux} = \frac{1}{M}\sum_{m=0}^{M-1}(X(m,k) - E|X(n,k)|)^2 \qquad (1)$$

where, $X(m,k)$ represents a $k^{th}$ frequency bin of the $m^{th}$ transformed frame;

$X(n,k)$ represents a $k^{th}$ frequency bin of the $n^{th}$ transformed frame; and $E|X(n,k)|$ represents a mean of a magnitude spectrum of the primary speech signal PSS for previous M transformed frames.

Spectral centroid is a measure used to characterize a frequency spectrum of the primary speech signal PSS. The spectral centroid indicates where a center of mass of the frequency spectrum of the primary speech signal PSS is located. In one embodiment, the analyzer 204 determines the spectral centroid for the present transformed frame of the primary speech signal PSS by using equation 2 below:

$$\text{Spectral Centroid} = \frac{\sum_{k=1}^{N} kF[k]}{\sum_{k=1}^{N} F[k]} \qquad (2)$$

where, $F[k]$ represents an amplitude of a $k^{th}$ frequency bin of the present transformed frame; and N represents a count of frequency bins in the present transformed frame.

It will apparent to those of skill in the art that the set of features SoF may include other features as well, for example, a spectral kurtosis, a spectral skewness, a spectral roll-off, a spectral spread, a spectral slope, or the like, without deviating from the scope of the invention.

The noise classification circuit 206 is a binary classifier that detects the type of noise present in the primary speech signal PSS. The noise classification circuit 206 is connected to the analyzer 204 for receiving the extracted set of features SoF. The noise classification circuit 206 also is connected to the memory 108 for receiving the trained classification model 110. The noise classification circuit 206 detects the type of noise (i.e., stationary or non-stationary noise) represented by the extracted set of features SoF based on the trained classification model 110. In one embodiment, the noise classification circuit 206 detects the noise type using a logistic regression technique. In another embodiment, the noise classification circuit 206 uses a neural network, a support vector machine, a binary classifier, or the like for determining the noise type. The noise classification circuit 206 outputs a first detection result Noise1_type when the detected type of noise is stationary noise and outputs a second detection result Noise1_type when the detected noise type is different from stationary noise, i.e., when the detected noise type is non-stationary noise.

The mode selection circuit 208 is connected to the battery 105 for receiving the battery power level signal BL. The mode selection circuit 208 also is connected to the MSC 200 for receiving the frames of the primary speech signal PSS and the frames of the first and second secondary speech signals SSS_1 and SSS_2. The mode selection circuit 208 further is connected to the noise classification circuit 206 for receiving one of the first and second detection results Noise1_type and Noise1_type. The mode selection circuit 208 enables the noise suppression circuit 106 to switch between the first and second modes of operation based on the first and second detection result Noise1_type and Noise2_type, and the battery power level indicated by the battery level signal BL. In the preferred embodiment, the mode selection circuit 208 selects the first mode of operation when the first detection result Noise1_type is received from the noise classification circuit 206; selects the first mode of operation when the battery level indicated by the battery level signal BL is less than the predetermined threshold level; and selects the second mode of operation when the second detection result Noise2_type is received from the noise classification circuit 206 and the battery level indicated by the battery level signal BL is greater than the predetermined threshold level. In the first mode of operation, the mode selection circuit 208 enables the first noise-reduction circuit 210a and in the second mode of operation, the mode selection circuit 208 enables the second noise-reduction circuit 210b.

If the noise suppression circuit 106 is operating in the first mode and the mode selection circuit 208 receives the second detection result Noise2_type from the noise classification circuit 206 and the battery level indicated by the battery level signal BL is greater than the threshold level, the mode selection circuit 208 instantly switches to the second mode of operation by enabling the second noise reduction circuit 210b. In other words, if the noise suppression circuit 106 is operating in the first mode and the battery level is greater than the threshold level, the noise suppression circuit 106 is instantly switched to the second mode of operation by the mode selection circuit 208 when the type of noise detected in the present transformed frame is the non-stationary noise.

If the noise suppression circuit 106 is operating in the first mode and the battery level indicated by the battery level signal BL is less than the predetermined threshold level, the mode selection circuit 208 selects the first mode of operation. In other words, if the noise suppression circuit 106 is operating in the first mode and the battery level is less than the threshold level, the noise suppression circuit 106 continues to operate in the first mode even if the type of noise detected in the present transformed frame is the non-stationary noise. The threshold level may be equal to fifteen percent of a total battery capacity of the battery 105. Thus, if the noise suppression circuit 106 is operating in the first mode and the battery level is at ten percent, then the noise suppression circuit 106 continues to operate in the first mode even if the mode selection circuit 208 receives the second detection result Noise2_type from the noise classification circuit 206.

If the noise suppression circuit 106 is operating in the second mode and the mode selection circuit 208 receives the first detection result Noise1_type from the noise classification circuit 206, the mode selection circuit 208 waits for a first duration or for a first count of the transformed frames before switching to the first mode of operation. For example, the mode selection circuit 208 does not switch from the second mode to the first mode until the mode selection circuit 208 receives the first detection result Noise1_type consecutively for the first count of the transformed frames, for example, five transformed frames. In a scenario where the mode selection circuit 208 receives the first detection result Noise1_type consecutively for the first count of the transformed frames, the mode selection circuit 208 selects the first mode of operation. In other words, if the noise suppression circuit 106 is operating in the second mode and the type of noise detected in five consecutive transformed frames is stationary noise, then the noise suppression circuit 106 is switched to the first mode by the mode selection circuit 208, otherwise the noise suppression circuit 106 continues to operate in the second mode of operation.

If the noise suppression circuit 106 is operating in the second mode and the mode selection circuit 208 receives the battery level signal BL that is less than the predetermined threshold value, then the mode selection circuit 208 instantly selects the first mode of operation. For example, the threshold level may be fifteen percent of the total battery capacity of the battery 105. Thus, if the noise suppression circuit 106 is operating in the second mode and the battery level indicated by the battery level signal BL is less than fifteen percent, the noise suppression circuit 106 switches to operate in the first mode of operation.

In the first mode of operation, the first noise-reduction circuit 210a is connected to the mode selection circuit 208 and receives the frames of the primary speech signal PSS and the frames of the first and second secondary speech signals SSS_1 and SSS_2. When enabled, the first noise-reduction circuit 210a suppresses the noise in the primary speech signal PSS and discards the first and second secondary speech signals SSS_1 and SSS_2 to generate the enhanced speech signal S_Out.

In the second mode of operation, the second noise-reduction circuit 210b is connected to the mode selection circuit 208 and receives the frames of the primary speech signal PSS and the frames of the first and second secondary speech signals SSS_1 and SSS_2. When enabled, the second noise-reduction circuit 210b suppresses the noise in the primary speech signal PSS using at least one of the first and second secondary speech signals SSS_1 and SSS_2 to generate the enhanced speech signal S_Out.

In operation, the MSC 200 receives the first through third speech signals S1_In-S3_In from the first through third mics 102a-102c. The MSC 200 identifies the first mic 102a as the primary mic and the second and third mics 102b and 102c as first and second secondary mics. Thus, the first speech signal S1_In acts as the primary speech signal PSS and the second and third speech signals S2_In and S3_In act as the first and second secondary speech signals SSS_1 and SSS_2. The MSC 200 samples and segments the primary speech signal PSS and the first and second secondary speech signals SSS_1 and SSS_2 to generate the corresponding frames.

The VAD 202 receives the frames of the primary speech signal PSS from the MSC 200. The VAD 202 discards the frames of the primary speech signal PSS that have the voice activity and identifies the non-speech region frames NRFs of the primary speech signal PSS. For example, the VAD 202 discards first through fifth frames of the primary speech signal PSS and identifies a sixth frame of the primary speech signal PSS as the non-speech region frame NRF. The VAD 202 then provides the non-speech region frame NRF (in this example, the sixth frame) to the analyzer 204.

The analyzer 204 transforms the received non-speech region frame NRF to the frequency domain and extracts the set of features SoF from the transformed frame. The analyzer 204 then provides the extracted set of features SoF to the noise classification circuit 206.

The noise classification circuit 206 receives the trained classification model 110 from the memory 108. Based on the received set of features SoF and the trained classification model 110, the noise classification circuit 206 detects the type of noise present in the transformed frame. The noise classification circuit 206 may detect that the type of noise present in the transformed frame is the stationary noise and thus outputs the first detection result Noise1_type.

The mode selection circuit 208 receives the first detection result Noise1_type from the noise classification circuit 206 and selects the first mode of operation and enables the first noise-reduction circuit 210a. The first noise-reduction circuit 210a, when enabled, suppresses the stationary noise present in the primary speech signal PSS, discards the frames of the first and second secondary speech signals SSS_1 and SSS_2, and generates the enhanced speech signal S_Out.

The noise suppression circuit 106 continues to suppress the noise in the primary speech signal PSS by operating in the first mode until the mode selection circuit 208 receives the second detection result Noise2_type. For example, seventh through twentieth frames of the primary speech signal PSS are non-speech region frames NRFs and the noise classification circuit 206 detects that the type of noise present in the seventh through twentieth frames of the primary speech signal PSS is stationary noise. Thus, for the seventh through twentieth frames, the mode selection circuit 208 continues to receive the first detection result Noise1_type and the noise suppression circuit 106 continues to operate in the first mode.

To continue with the example, if the twenty-first frame of the primary speech signal PSS is a non-speech region frame NRF, then the noise classification circuit 206 detects that the type of noise present in the twenty-first frame of the primary speech signal PSS is non-stationary noise, the noise classification circuit 206 generates the second detection result Noise2_type. When the mode selection circuit 208 receives the second detection result Noise2_type from the noise classification circuit 206, the mode selection circuit 208 also checks whether the battery level indicated by the battery level signal BL is greater than the threshold level. When the mode selection circuit 208 determines that the battery level is less than the threshold level, the mode selection circuit 208 selects the first mode and the noise suppression circuit 106 continues to operate in the first mode. When the mode selection circuit 208 determines that the battery level is greater than the threshold level, the mode selection circuit 208 instantly selects the second mode of operation, thereby enabling the second noise-reduction circuit 210b and disabling the first noise-reduction circuit 210a. In other words, the noise suppression circuit 106 instantly switches from the first mode to the second mode when the noise classification circuit 206 detects that the type of noise present in the twenty-first frame of the primary speech signal PSS is non-stationary noise and the battery level is greater than the threshold level. The second noise-reduction circuit 210b, when enabled, suppresses the noise in the primary speech signal PSS using at least one of the first and second secondary speech signals SSS_1 and SSS_2 and generates the enhanced speech signal S_Out.

In our continuing example, the noise classification circuit 206 detects that the type of noise present in twenty-second through twenty-sixth frames of the primary speech signal PSS is non-stationary noise and the battery level is greater than the threshold level, so for the twenty-second through twenty-sixth frames, the mode selection circuit 208 continues to receive the second detection result Noise2_type and the noise suppression circuit 106 continues to operate in the second mode of operation.

For the twenty-seventh frame of the primary speech signal PSS, the noise classification circuit 206 detects that the type of noise present in the primary speech signal PSS is stationary noise. Thus, the mode selection circuit 208 receives the first detection result Noise1_type from the noise classification circuit 206. In this scenario, the mode selection circuit 208 does not switch from the second mode to the first mode of operation until the mode selection circuit 208 receives the first detection result Noise1_type consecutively for the first count of the transformed frames, for example, five transformed frames. In a scenario where the mode selection circuit 208 receives the first detection result Noise1_type consecutively for the next five transformed frames, the mode selection circuit 208 selects the first mode of operation, otherwise the noise suppression circuit 106 continues to operate in the second mode of operation.

In another example, if for the twenty-seventh frame of the primary speech signal PSS, the mode selection circuit 208 receives the second detection result Noise2_type from the noise classification circuit 206 and the battery level signal BL indicates that the battery level is less than the threshold level, then the mode selection circuit 208 instantly selects the first mode of operation, thereby enabling the first noise-reduction circuit 210a and disabling the second noise-reduction circuit 210b.

In another embodiment, the electronic device 100 is powered by an external power source. The external power source may be a battery-powered device or a battery-less power source. When the external power source is a battery-powered device, the mode selection circuit 208 receives the battery level signal BL from the external power source to indicate the battery level of the external power source. When the external power source is a battery-less power source, the selection between the first and second modes of operation by the mode selection circuit 208 is independent of the battery level signal BL, i.e., one of the first and second mode of operations is selected based only on the type of noise detected by the noise classification circuit 206.

Figure 3A:
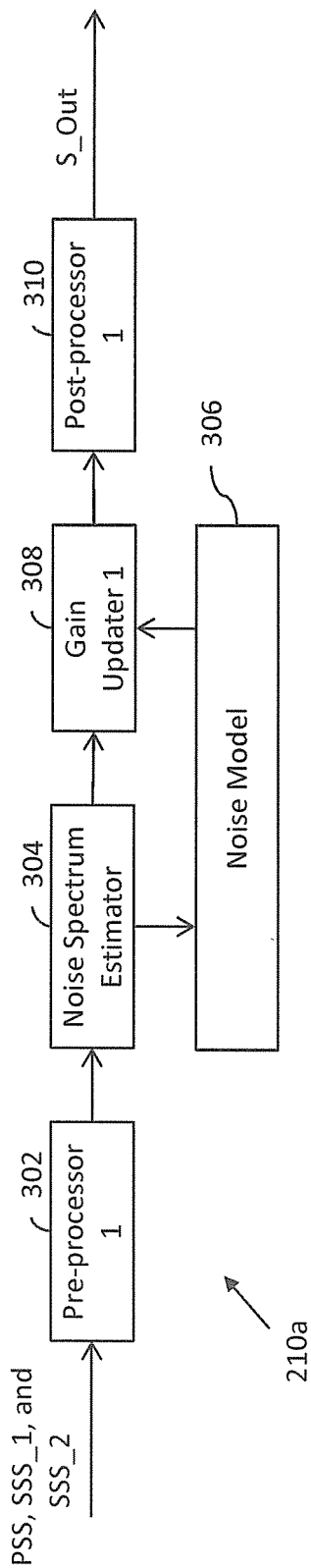
FIG. 3A is a schematic block diagram of a first noise-reduction circuit of the audio processing system of FIG. 1 in accordance with an embodiment of the present invention.

Referring now to FIG. 3A, a block diagram of the first noise-reduction circuit 210a included in the audio processing system 104 in accordance with an embodiment of the present invention is shown. The first noise-reduction circuit 210a utilizes a one-mic noise suppression technique for suppressing the stationary noise in the primary speech signal PSS, which uses less power than a non-stationary noise technique because for stationary noise, just the audio signal from the primary microphone is processed, while for non-stationary noise, audios signals from multiple microphones are processed. The first noise-reduction circuit 210a includes a first pre-processor 302, a noise spectrum estimator 304, a noise model 306, a first gain updater 308, and a first post-processor 310.

In the first mode of operation, the first noise-reduction circuit 210a is enabled and receives the frames of the primary speech signal PSS and the frames of the first and second secondary speech signals SSS_1 and SSS_2 from the mode selection circuit 208. The first pre-processor 302 discards the frames of the first and second secondary speech signals SSS_1 and SSS_2. In an alternative embodiment, the first pre-processor 302 receives only the primary speech signal PSS. The first pre-processor 302 transforms each frame of the primary speech signal PSS from the time domain to the frequency domain by applying a windowing technique followed by a FFT. Examples of the windowing technique performed by the first pre-processor 302 include a Hanning window, a Rectangular window, a Hamming window and the like. Hereinafter, the frames of the primary speech signal PSS that are transformed to the frequency domain are referred to as "primary transformed frames". The first pre-processor 302 provides the primary transformed frames to the noise spectrum estimator 304.

The noise spectrum estimator 304 receives the primary transformed frames and estimates a value of the noise (i.e., a noise floor) present in the primary speech signal PSS. To estimate the noise floor, the noise spectrum estimator 304 smoothens the magnitude spectrum of a first set of primary transformed frames and identifies a minimum magnitude value in the smoothened magnitude spectrum. The minimum magnitude value identified by the noise spectrum estimator 304 corresponds to the noise floor. The noise spectrum estimator 304 stores the noise floor in the noise model 306 and provides the primary transformed frames to the first gain updater 308.

The first gain updater 308 receives the primary transformed frames from the noise spectrum estimator 304 and the noise floor from the noise model. The first gain updater 308 uses the noise floor to reduce a gain of the noise present in the primary transformed frames, thereby suppressing the noise in the primary transformed frames. For example, based on the noise floor, the first gain updater 308 identifies those frequency bins in the primary transformed frames that represent the noise and reduces the gain of the identified frequency bins to suppress the noise.

The first post-processor 310 is connected to the first gain updater 308 and receives the primary transformed frames in which the noise has been suppressed. The first post-processor 310 transforms the primary transformed frames in which the noise is suppressed from the frequency domain to the time domain by applying an inverse FFT (IFFT) followed by an inverse windowing technique to generate the enhanced speech signal S_Out.

It will be apparent to a person of skill in the art that the first noise-reduction circuit 210a is an illustrative example of a noise-reduction circuit used to suppress stationary noise. In another embodiment, any noise-reduction circuit that suppresses the stationary noise using the one-mic noise suppression technique may be used instead of the first noise-reduction circuit 210a.

Figure 3B:
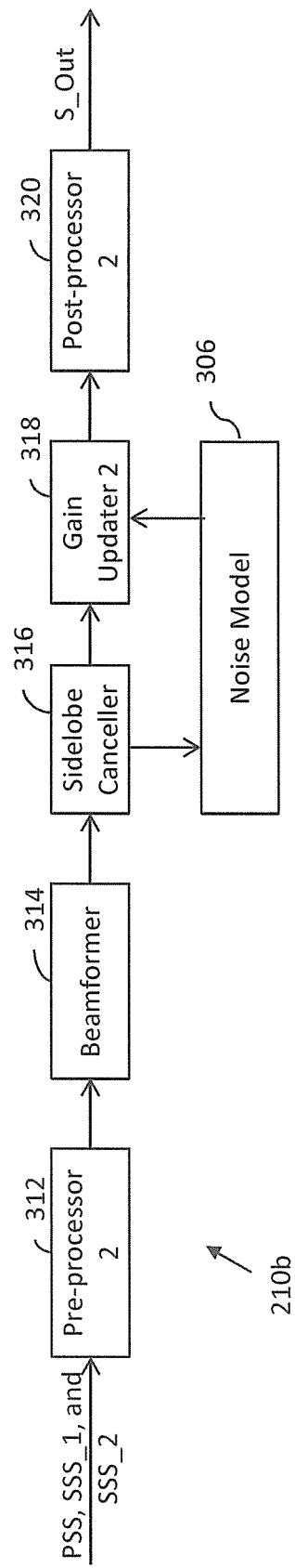
FIG. 3B is a schematic block diagram of a second noise-reduction circuit of the audio processing system of FIG. 1 in accordance with an embodiment of the present invention.

Referring now to FIG. 3B, a block diagram of the second noise-reduction circuit 210b included in the audio processing system 104 in accordance with an embodiment of the present invention is shown. The second noise-reduction circuit 210b uses an n-mic noise suppression technique for suppressing the non-stationary noise in the primary speech signal PSS. The second noise-reduction circuit 210b includes a second pre-processor 312, a beamformer 314, a sidelobe canceller 316, a second gain updater 318, and a second post-processor 320.

In the second mode of operation, the second noise-reduction circuit 210b is enabled. When the second noise-reduction circuit 210b is enabled, the second pre-processor 312 receives the frames of the primary speech signal PSS as well as the first and second secondary speech signals SSS_1 and SSS_2 from the mode selection circuit 208. The second pre-processor 312 transforms the frames of the primary speech signal PSS and the first and second secondary speech signals SSS_1 and SSS_2 from the time domain to the frequency domain by applying the windowing technique followed by the FFT, as done by the first pre-processor 302. Hereinafter, the frames of the first and second secondary speech signals SSS_1 and SSS_2 that have been converted to the frequency domain are referred to as "secondary transformed frames". The second pre-processor 312 provides the primary and secondary transformed frames to the beamformer 314.

The beamformer 314 receives the primary and secondary transformed frames and aligns a phase of the secondary transformed frames with a phase of the primary transformed frames and then adds the aligned secondary transformed frames to the primary transformed frames to generate speech reference frames. In each speech reference frame, target speech sounds present in the corresponding primary and secondary transformed frame are in phase (i.e., constructive interference) and the noise present in the corresponding primary and secondary transformed frames is shifted out of phase (i.e., destructive interference).

The sidelobe canceller 316 is connected to the beamformer 314 and receives the primary transformed frames, the secondary transformed frames, and the speech reference frames. The sidelobe canceller 316 identifies a noise reference using the primary transformed frames, the secondary transformed frames, and the speech reference frames. The sidelobe canceller 316 then stores the noise reference in the noise model 306. In the presently preferred embodiment, the same noise model 306 is shared by the first and second noise-reduction circuits 210a and 210b so that the time required to switch between the operation modes is not impacted by having to wait on storage of the noise reference.

The second gain updater 318 is connected to the sidelobe canceller 316 and receives the speech reference frames. The second gain updater 318 also is connected to the noise model 306 for receiving the noise reference. The second gain updater 318 uses the noise reference to reduce the gain of the noise present in the speech reference frames, thereby suppressing the noise present in the primary speech signal PSS.

The second post-processor 320 is connected to the second gain updater 318 for receiving the speech reference frames in which the noise has been suppressed. The second post-processor 320 transforms these speech reference frames from the frequency domain to the time domain by applying an IFFT followed by an inverse windowing technique to generate the enhanced speech signal S_Out.

It will be apparent to a person of skill in the art that the second noise-reduction circuit 210b is an illustrative example of a noise-reduction circuit and that any noise-reduction circuit that suppresses non-stationary noise using an n-mic noise suppression technique may be used.

Figure 4A:
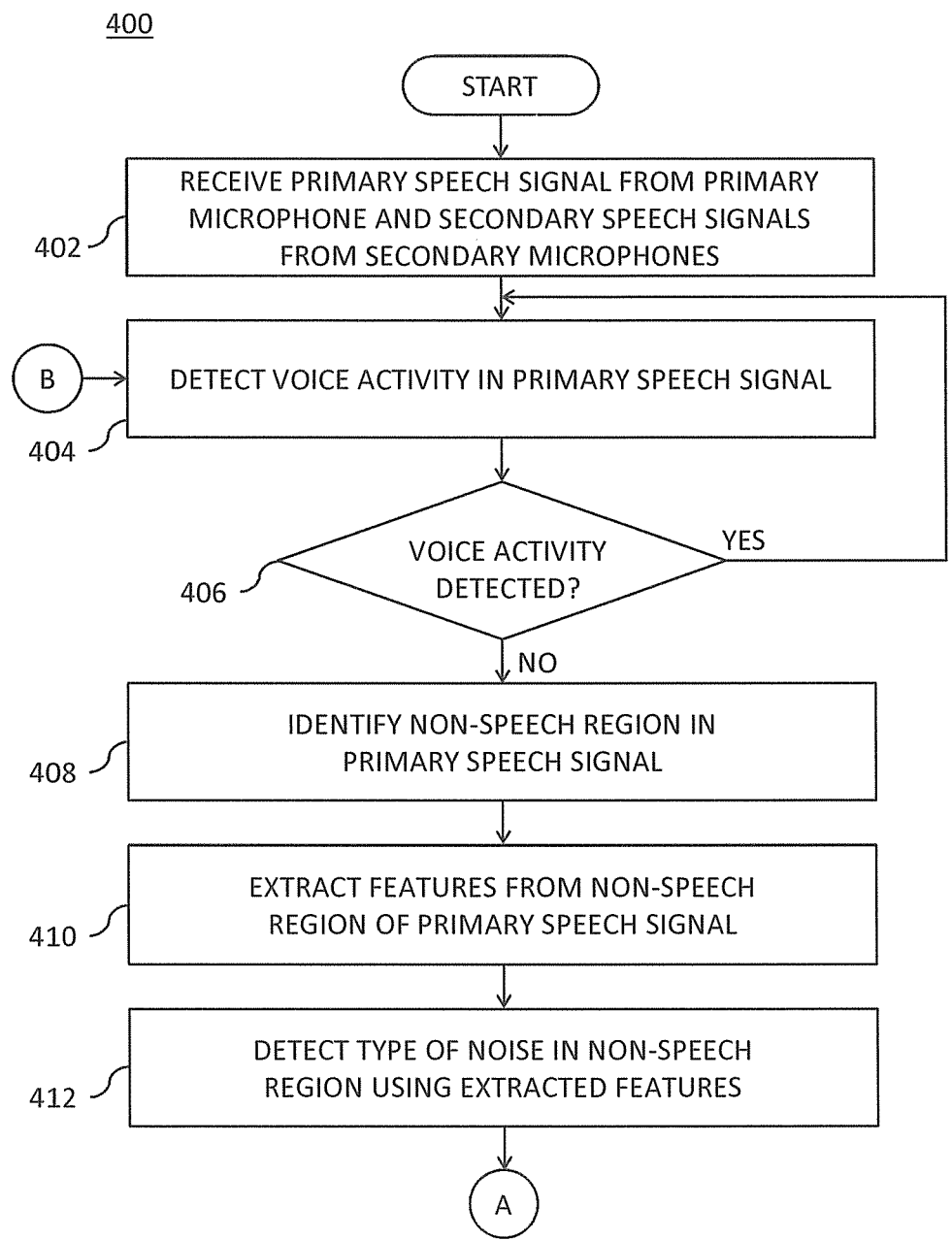
FIGS. 4A and 4B are a flowchart illustrating a method for speech enhancement in accordance with an embodiment of the present invention.
Figure 4B:
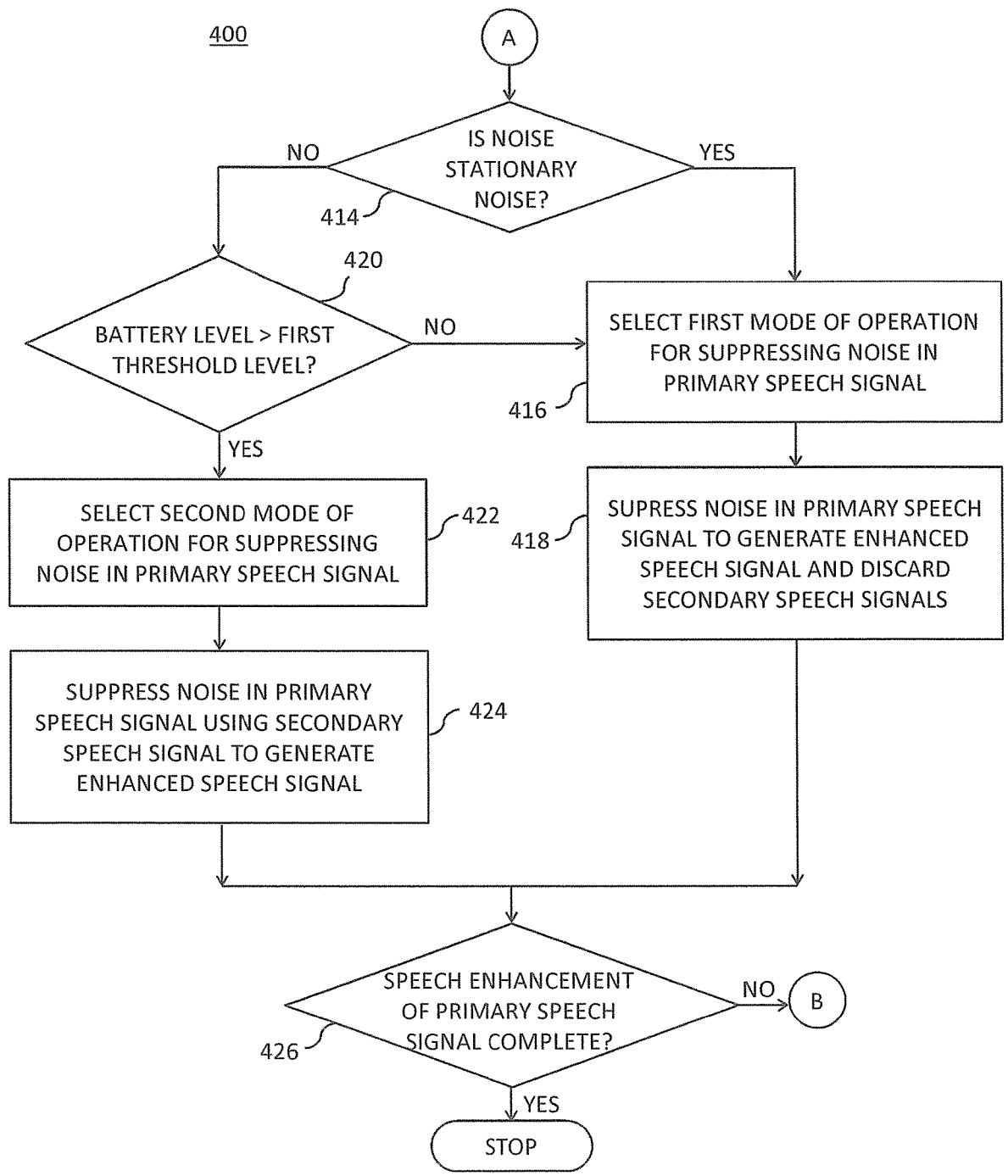

FIGS. 4A and 4B are a flow chart 400 illustrating a method for speech enhancement in accordance with an embodiment of the present invention.

At step 402, the primary speech signal PSS is received from the primary mic 102a and the first and second secondary speech signals SSS_1 and SSS_2 are received from the first and second secondary mics 102b and 102c, respectively, by the MSC 200. The MSC 200 samples and segments the primary speech signal PSS and the first and second secondary speech signals SSS_1 and SSS_2 into the corresponding frames.

At step 404, the voice activity is detected in the primary speech signal PSS by the VAD 202. The VAD 202 detects the voice activity in each frame of the primary speech signal PSS. At step 406, the VAD 202 determines whether any voice activity has been detected in the present frame of the primary speech signal PSS. At step 406, if voice activity has been detected, then step 404 is executed for a next frame of the primary speech signal PSS. However, if no voice activity has been detected in the present frame, then step 408 is executed.

At step 408, the non-speech region of the primary speech signal PSS is identified by the VAD 202. The frame of the primary speech signal PSS in which no voice activity has been detected by the VAD 202 is identified as the non-speech region (i.e., the non-speech region frame NRF).

At step 410, the set of features SoF is extracted by the analyzer 204 from the non-speech region of the primary speech signal PSS. In other words, the analyzer 204 extracts the SoF from the present non-speech region frame NRF of the primary speech signal PSS. The set of features include the spectral flux, the spectral centroid, the spectral kurtosis, the spectral skewness, the spectral roll-off, the spectral spread, a spectral slope, and the like. At step 412, the type of noise in the non-speech region is detected by the noise classification circuit 206 using the extracted set of features SoF and the trained classification model 110. At step 414, the noise classification circuit 206 determines whether the detected type of noise is stationary noise and if yes, the detected type of noise is stationary noise, then step 416 is performed; otherwise, step 420 is performed. At step 416, the first mode of operation is selected by the mode selection circuit 208 for suppressing the noise in the primary speech signal PSS. At step 418, the noise in the primary speech signal PSS is suppressed by the first noise-reduction circuit 210a to generate the enhanced speech signal S_Out. The first noise-reduction circuit 210a suppresses the noise in the primary speech signal and discards the first and second secondary speech signals SSS_1 and SSS_2.

If at step 414, it is determined that the type of noise is not stationary noise, then step 420 is executed. At step 420, the mode selection circuit 208 determines whether the battery level of the electronic device 100 is greater than the predetermined threshold level and if not, then step 416 is performed, otherwise, step 422 is performed. At step 422, the second mode of operation is selected by the mode selection circuit 208 for suppressing the noise present in the primary speech signal PSS. At step 424, the noise in the primary speech signal PSS is suppressed by the second noise-reduction circuit 210b using at least one of the first and second secondary speech signals SSS_1 and SSS_2 to generate the enhanced speech signal S_Out.

At step 426, the noise suppression circuit 106 determines whether the speech enhancement of the primary speech signal PSS is complete. If at step 426, it is determined that the speech enhancement of the primary speech signal PSS is not complete, the method loops back to step 404, otherwise, it is determined that the speech enhancement of the primary speech signal PSS is done, and the method ends.

The noise suppression circuit 106 dynamically switches between first and second modes of operation based on the type of noise detected in the primary speech signal PSS and the battery power level indicated by the battery level signal BL. In the first mode, the first noise-reduction circuit 210a, which performs a one-mic noise suppression technique, is used for suppressing the noise in the primary speech signal PSS. Thus, when the type of noise detected in the primary speech signal PSS is only stationary noise, the noise suppression circuit 106 does not process the first and second secondary speech signals SSS_1 and SSS_2 yet maintains the quality of the enhanced speech signal S_Out. Since the noise suppression circuit 106 does not process the secondary speech signals SSS_1 and SSS_2 in the first mode, the noise suppression circuit 106 uses less processing power. In the second mode of operation, the second noise-reduction circuit 210b, which operates using a n-mic noise suppression technique, is used for suppressing the noise in the primary speech signal PSS. Since the second noise-reduction circuit 210b consumes more power than the first noise-reduction circuit 210a, the mode selection circuit 208 selects the second mode of operation only when the type of noise detected in the primary speech signal PSS is non-stationary noise and the battery power level of the battery 105 is greater than a predetermined threshold level (e.g., 15%). As the second noise-reduction circuit 210b is capable of handling both the types of noise, i.e., stationary and non-stationary noise, the quality of the enhanced speech signal S_Out is high. The first and second noise-reduction circuits 210a and 210b do not operate simultaneously, which reduces the processing power required by the noise suppression circuit 106, thereby reducing a power consumed by the noise suppression circuit 106. If the electronic device 100 is a portable device with limited battery back-up, the reduction in power consumption by the noise suppression circuit 106 is of great significance.

While various embodiments of the present invention have been illustrated and described, it will be clear that the present invention is not limited to these embodiments only. Numerous modifications, changes, variations, substitutions, and equivalents will be apparent to those skilled in the art, without departing from the spirit and scope of the present invention, as described in the claims.

The invention claimed is:

1. An audio processing system, comprising:
a noise suppression circuit having a first mode of operation and a second mode of operation, wherein the noise suppression circuit is configured to:
receive a primary speech signal from a primary microphone of a plurality of microphones,
extract a set of features from a non-speech region of the primary speech signal,
detect a type of noise in the non-speech region based on the extracted set of features, and
select one of the first mode of operation and the second mode of operation based on the detected type of noise, that in response suppresses noise in the primary speech signal;
wherein the noise suppression circuit is further configured to select one of the first mode of operation and the second mode of operation based on a power level of a power source associated with the audio processing system, and wherein:
the first mode of operation is selected when the detected type of noise is stationary noise,
the first mode of operation is further selected when the detected type of noise is different from the stationary noise and the power level is less than the threshold level, and
the second mode of operation is selected when the detected type of noise is different from the stationary noise and the power level is greater than a threshold level.

2. The audio processing system of claim 1, further comprising:
a memory that is connected to the noise suppression circuit and stores a trained classification model that is trained to detect the type of noise in the non-speech region,
wherein the noise suppression circuit detects the type of noise in the non-speech region further based on the trained classification model.

3. The audio processing system of claim 1, wherein the noise suppression circuit is further configured to:
detect a voice activity in the primary speech signal, and identify the non-speech region of the primary speech signal based on the detection of the voice activity.

4. The audio processing system of claim 1, wherein the noise suppression circuit is further configured to:
receive one or more secondary speech signals from one or more secondary microphones of the plurality of microphones, respectively.

5. The audio processing system of claim 4, wherein the noise suppression circuit is further configured to:
suppress the noise in the primary speech signal to generate an enhanced speech signal based on the selection of one of the first mode of operation and the second mode of operation, wherein:
in the first mode of operation, the noise suppression circuit supresses the noise in the primary speech signal and discards the one or more secondary speech signals; and
in the second mode of operation, the noise suppression circuit supresses the noise in the primary speech signal by way of at least one secondary speech signal of the one or more secondary speech signals.

6. The audio processing system of claim 1,
wherein the extracted set of features includes at least one of a spectral flux and a spectral centroid of the non-speech region.

7. An audio processing method, comprising:
receiving, by a noise suppression circuit, a primary speech signal from a primary microphone of a plurality of microphones;
extracting, by the noise suppression circuit, a set of features from a non-speech region of the primary speech signal;
detecting, by the noise suppression circuit, a type of noise in the non-speech region based on the extracted set of features; and
selecting, by the noise suppression circuit, based on the detected type of noise, one of a first mode of operation and a second mode of operation for suppressing noise in the primary speech signal;
wherein the set of features includes at least one of a spectral flux and a spectral centroid of the non-speech region.

8. The audio processing method of claim 7, wherein one of the first mode of operation and the second mode of operation is further selected based on a battery level of a battery associated with the noise suppression circuit, and wherein:
the first mode of operation is selected when the detected type of noise is stationary noise,
the first mode of operation is further selected when the detected type of noise is different from the stationary noise and the battery level is less than the threshold level, and
the second mode of operation is selected when the detected type of noise is different from the stationary noise and the battery level is greater than a threshold level.

9. The audio processing method of claim 7, further comprising:
detecting, by the noise suppression circuit, a voice activity in the primary speech signal; and
identifying, by the noise suppression circuit, the non-speech region of the primary speech signal based on the detection of the voice activity.

10. The audio processing method of claim 7,
wherein the type of noise in the non-speech region is further detected based on a trained classification model stored in a memory, and
wherein the trained classification model is trained to detect the type of noise in the non-speech region.

11. The audio processing method of claim 7, further comprising:
receiving, by the noise suppression circuit, one or more secondary speech signals from one or more secondary microphones of the plurality of microphones, respectively; and
suppressing, by the noise suppression circuit, the noise in the primary speech signal to generate an enhanced speech signal based on the selection of one of the first mode of operation and the second mode of operation, wherein:
in the first mode of operation, the noise in the primary speech signal is suppressed and the one or more secondary speech signals are discarded; and
in the second mode of operation, the noise in the primary speech signal is suppressed by way of at least one secondary speech signal of the one or more secondary speech signals.

12. A noise suppression circuit, comprising:
an analyzer configured to receive a primary speech signal and extract a set of features from a non-speech region of the primary speech signal;
a noise classifier configured to receive the extracted set of features from the analyzer and detect a type of noise in the non-speech region based on the extracted set of features; and
a mode selector configured to select one of a first mode of operation of the noise suppression circuit and a second mode of operation of the noise suppression circuit based on the detected type of noise, that in response suppresses noise in the primary speech signal;
a microphone selection circuit configured to be coupled to a plurality of microphones and,
receive a plurality of speech signals from the plurality of microphones,
identify a primary microphone from the plurality of microphones based on the plurality of speech signals, wherein a speech signal included in the plurality of speech signals and received from the identified primary microphone, is the primary speech signal, and
a voice activity detector coupled to the microphone selection circuit and configured to,
receive the primary speech signal from the microphone selection circuit,
detect a voice activity in the primary speech signal, and
identify the non-speech region of the primary speech signal based on the detection of the voice activity.

13. The noise suppression circuit of claim 12,
wherein the mode selector selects one of the first mode of operation and the second mode of operation further based on a battery level of a battery associated with the noise suppression circuit, and wherein:
the first mode of operation is selected when the detected type of noise is stationary noise,
the first mode of operation is further selected when the detected type of noise is different from the stationary noise and the battery level is less than the threshold level, and the second mode of operation is selected when the detected type of noise is different from the stationary noise and the battery level is greater than a threshold level.

14. The noise suppression circuit of claim 12, wherein the microphone selection circuit is further configured to:
   identify one or more secondary microphones from the plurality of microphones based on the plurality of speech signals,
   wherein one or more speech signals included in the plurality of speech signals and received from the identified one or more secondary microphones are one or more secondary speech signals, respectively.

15. The noise suppression circuit of claim 14, further comprising:
   a first noise-reduction circuit that is enabled when the first mode of operation is selected,
   wherein the first noise-reduction circuit discards the one or more secondary speech signals and suppresses the noise in the primary speech signal to generate an enhanced speech signal; and
   a second noise-reduction circuit that is enabled when the second mode of operation is selected,
   wherein the second noise-reduction circuit suppresses the noise in the primary speech signal by way of at least one secondary speech signal of the one or more secondary speech signals to generate the enhanced speech signal.

16. The noise suppression circuit of claim 12,
   wherein the noise classifier detects the type of noise in the non-speech region further based on a trained classification model stored in a memory, and
   wherein the trained classification model is trained to detect the type of noise in the primary speech signal.

17. The noise suppression circuit of claim 12,
   wherein the set of features includes at least one of a spectral flux and a spectral centroid of the non-speech region.

18. A noise suppression circuit, comprising:
   an analyzer configured to receive a primary speech signal and extract a set of features from a non-speech region of the primary speech signal;
   a noise classifier configured to receive the extracted set of features from the analyzer and detect a type of noise in the non-speech region based on the extracted set of features; and
   a mode selector configured to select one of a first mode of operation of the noise suppression circuit and a second mode of operation of the noise suppression circuit based on the detected type of noise, that in response suppresses noise in the primary speech signal;
   wherein the set of features includes at least one of a spectral flux and a spectral centroid of the non-speech region.

* * * * *